UNITED STATES PATENT OFFICE.

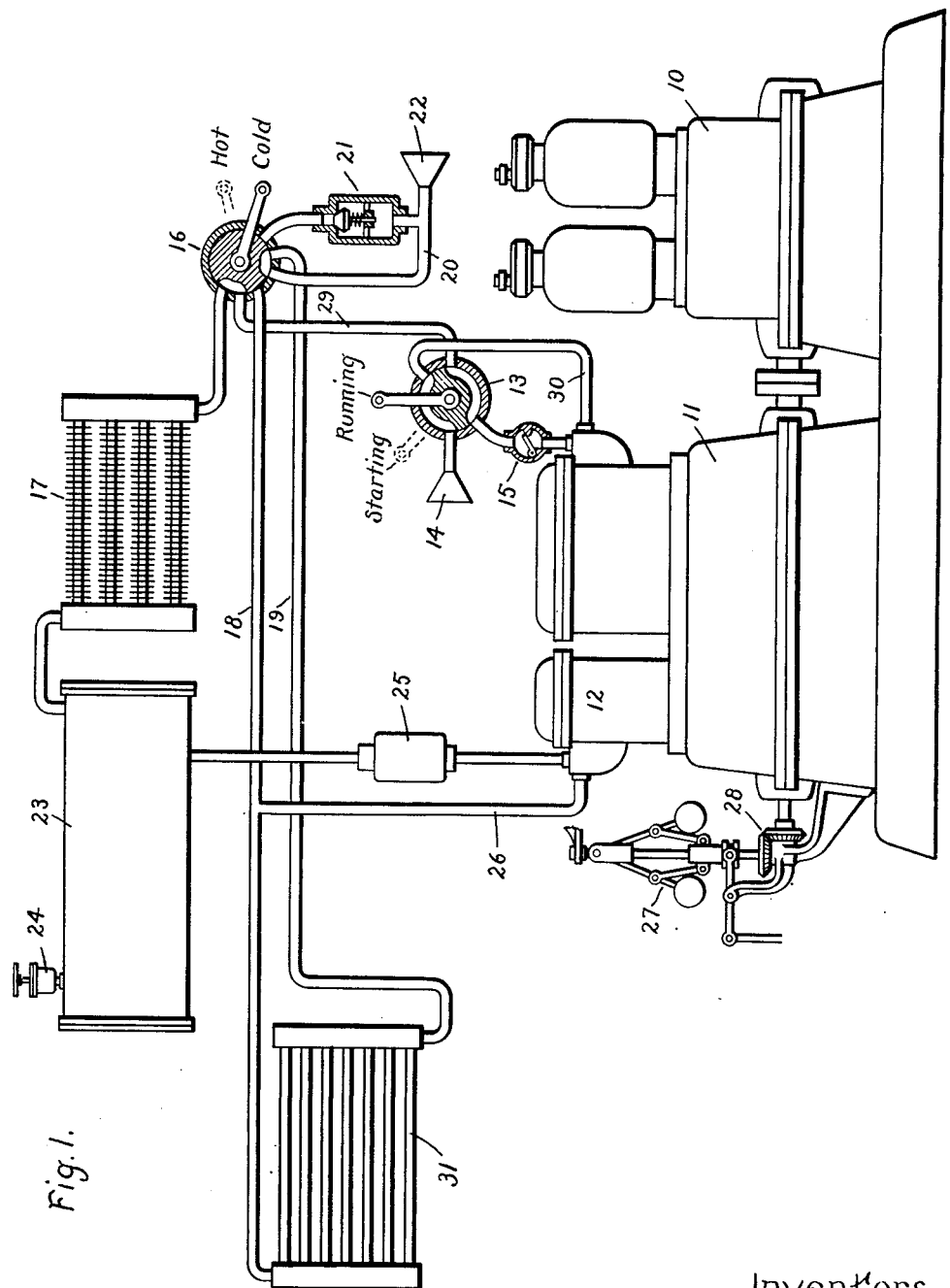

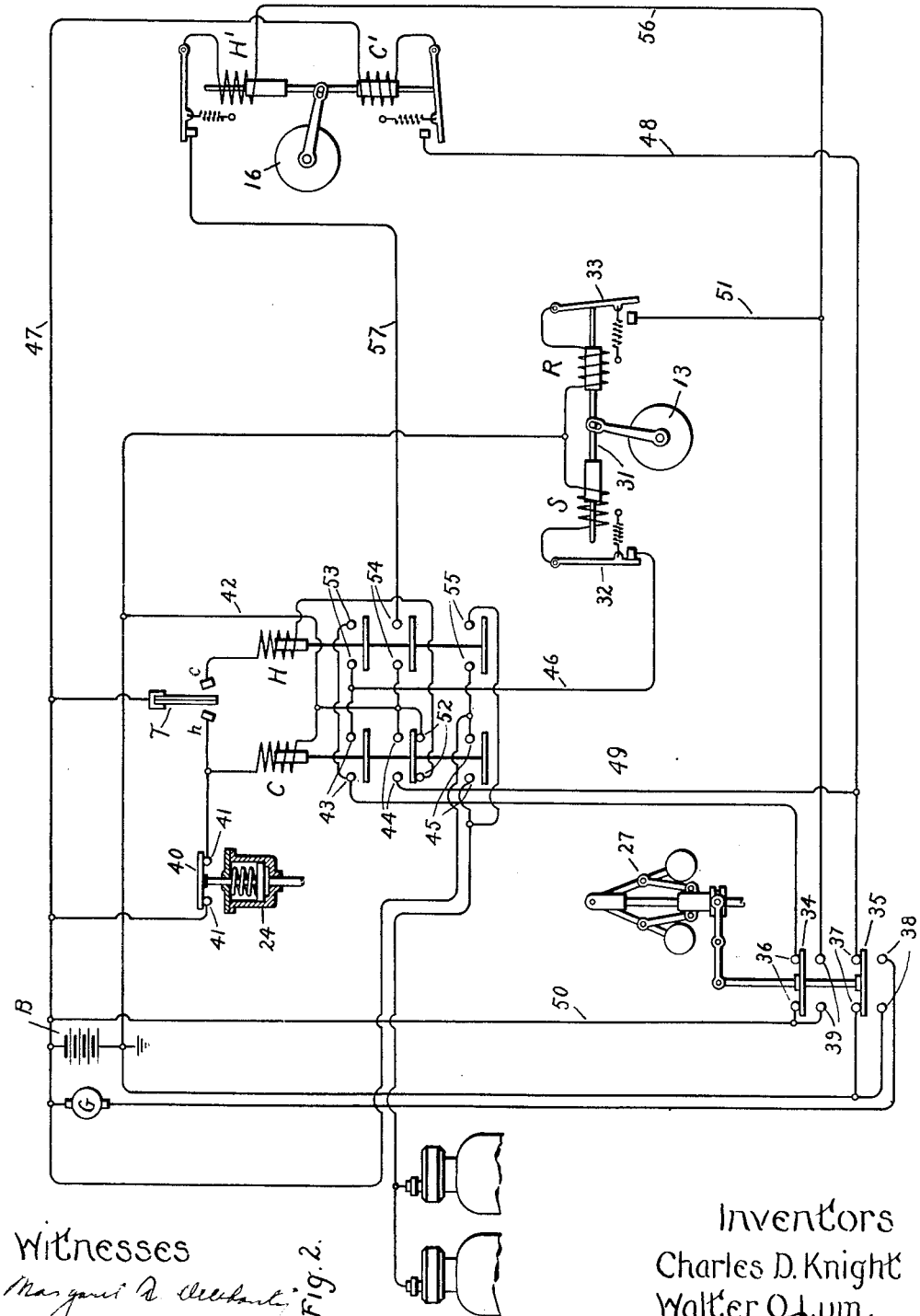

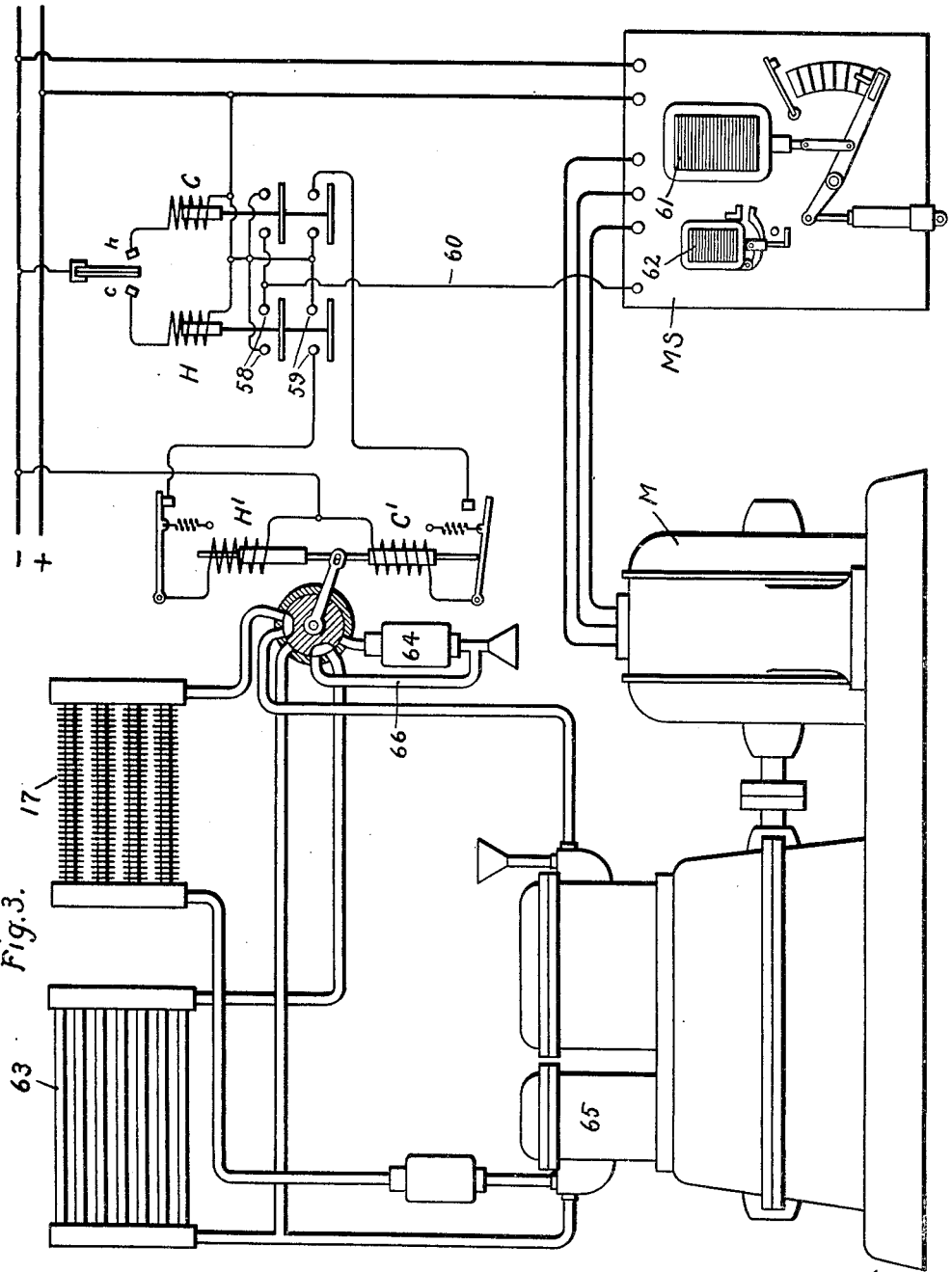

CHARLES D. KNIGHT, OF SCHENECTADY, AND WALTER O. LUM, OF AMSTERDAM, NEW YORK.

TEMPERATURE-REGULATING SYSTEM.

932,711.   Specification of Letters Patent.   Patented Aug. 31, 1909.

Application filed March 17, 1909. Serial No. 484,048.

*To all whom it may concern:*

Be it known that we, CHARLES D. KNIGHT and WALTER O. LUM, citizens of the United States, residing, respectively, at Schenectady, county of Schenectady, State of New York, and Amsterdam, county of Montgomery, State of New York, have invented certain new and useful Improvements in Temperature-Regulating Systems, of which the following is a specification.

This invention relates to means for either heating or cooling space which it is desired shall be maintained at a predetermined temperature, one of the objects of our invention being to utilize compressed air as a medium for bringing about the desired result.

In carrying out our invention, we cause either hot or cool air to be circulated throughout a piping system arranged in the space to be heated or cooled. An air compressor, driven in any desired manner, is so arranged and associated with the other apparatus that the air which is compressed is cooled, as for instance by being worked in an expanding cylinder and is then circulated through the cool spaces.

Our invention likewise contemplates the circulation of the heated compressed air through the piping system, the arrangement being such that the air is kept under a predetermined pressure, depending upon the temperature desired.

Another object of our invention is to produce a heating and refrigerating system which is automatic, that is, one in which either the heating or cooling apparatus, depending upon the conditions, is started automatically. In some cases, as for instance, where freight cars or the like are transported between distant points, there is a considerable change in temperature and the contents of the cars may be such as to require a constant temperature. In order to produce this result, we so arrange the heating and cooling apparatus that they are controlled by the temperature conditions, the arrangement being such that when the temperature falls to a certain point the heating apparatus is started, whereas when the temperature rises to a predetermined point, the cooling apparatus is started. The valves and other mechanism for changing from the heating to the cooling condition and vice versa are operated electromagnetically, and we employ a thermostatic switch for controlling the various electric circuits. We have found it desirable in most cases and essential in others that the compressor be directly driven by means of a prime mover, as for instance a gas engine or an electric motor, means being provided whereby the thermostat will start the motor or the gas engine. In the case where a gas engine is used, it is desirable that some means be provided for automatically starting and we accomplish this result by utilizing the compressed air for this purpose.

Other objects of our invention will appear in the course of the following specification, in which we have shown our invention embodied in concrete mechanism for purposes of illustration.

In the accompanying drawings illustrating our invention, Figure 1 shows an arrangement of apparatus in which a gas engine is employed; Fig. 2 is a diagram of the circuit connections; and Fig. 3 shows an arrangement in which an electric motor is used to drive the compressor.

Referring first to Fig. 1, 10 represents a prime mover, as for instance, an internal combustion or gas engine. 11 represents an air compressor directly connected to the gas engine so as to be driven thereby. The compressor is provided with an expanding cylinder 12 which is mounted upon the compressor for purposes hereinafter set forth. The compressor is connected with a valve 13, which is arranged to be automatically operated in two positions, one of which is shown in full lines and the other in dotted lines. When the valve is in the position shown in full lines, the compressor is connected with an intake funnel 14 and the compressed air from the cylinders of the compressor discharges through a check valve 15, thence through valve 13 to another automatically operated valve 16. This valve 16 likewise has two positions, one of which is shown in full and the other in dotted lines. In addition to the connection with the valve 13, valve 16 is connected with a radiator 17 and with a pipe 18 leading to the piping system, so that with the valve in the position shown in full lines the compressed air from the compressor will pass through the radiator 17, whereas, in the other position, it will be passed through the pipe 18 into the piping system and the radiator will be cut off. The valve 16 likewise has another function, viz.

to connect pipe 19 of the piping system either with the atmosphere through pipe 20 or through the pressure operated valve 21 and thence to atmosphere through the funnel 22. Connected with the radiator 17 is a reservoir or pressure tank 23, provided with a pressure controlled valve 24. This tank 23 is connected with the expanding cylinder 12 through a pressure operated valve 25 similar to valve 21. The exhaust pipe 26 from the expander connects with pipe 18 of the piping system. A governing device, as for instance a centrifugal governor 27, is connected with the shaft of the compressor by beveled gearing 28, as shown, for purposes hereinafter described.

The operation of the mechanism thus far described, aside from the electrical connections, is as follows, assuming that there is a pressure in the tank 23 of say 125 pounds when the controlling mechanism, hereinafter described, is moved in position to start the engine of the compressor. Under these conditions, assuming that cold air is to be circulated through the pipes; valve 13 will be in the position shown in dotted lines and marked "Starting" while the valve 16 will be in the position shown in full lines and marked "Cold". As soon as valve 13 is moved to the starting position, compressed air passes through radiator 17 through valve 16, pipe 29, to valve 13, thence through pipe 30 to the compressor. The compressor now receiving air under pressure acts as an air engine to start the gas engine. As soon as the gas engine starts and takes up the load, it speeds up and the governor 27 operates to throw the valve 13 into running position in a manner hereinafter described. The compressor is now driven in the regular way and compressed air delivered through the check valve 15, pipe 29, valve 16, radiator 17 and pressure tank 23. The valve 25 is arranged to open at a predetermined pressure so that, assuming that the pressure in the tank 23 is 125 pounds, the air will pass through the valve 25 and into the expanding cylinder 12. This cylinder 12 is arranged to do useful work on the compressor shaft and the air is thereby expanded and exhausted through the pipe 26 at a low temperature, depending principally upon the initial pressure and temperature and the amount of expansion. Cool air is now circulated through the pipe 26 to the piping system, the air returning through pipes 19 and 20 to atmosphere through funnel 22. This cycle of operations will be continued during the existence of the conditions calling for it, as for instance, as long as the thermostat remains in contact on its hot side. When the thermostatic switch is opened the gas engine will be stopped and circulation will cease. Assuming again that there is a pressure of 125 pounds in the tank 23 and it is desired to deliver hot air to the circulating pipes, as for instance, when the thermostat engages with the contact on the cool side. Under these conditions, the valve 13 is again moved to starting position, but the valve 16 will be moved after starting to the position shown in dotted lines and marked "Hot". The same cycle of operation will take place during starting, namely, the compressor will act as an air engine to start the gas engine and after the gas engine is started will run in the regular way. In this case, however, the compressed air, instead of going through the radiator 17 to tank 23, goes from the valve 16 directly into pipe 18 and to the coils 31. The return through the pipe 19 instead of going from the valve 16 through pipe 20 now goes through the valve 21. This valve is arranged to keep the air under definite pressure depending upon the temperature desired. When this pressure is exceeded the valve will open and allow the air to go out through the funnel 22. In other words, with this condition, the air, instead of going into the tank 23 and thence being expanded and cooled, passes into the piping system directly, the piping system having its exhaust closed so as to keep the air under pressure, so that the hot compressed air is circulated. If there is a leak in the piping system and the pressure in the tank drops below a predetermined point, the valve 24 will operate and start the engine in a manner hereinafter described. The pressure at which the valve 24 operates is lower than that at which the valve 25 operates.

Turning now to Fig. 2, which shows the circuit connections, G is the generator or magneto which may be driven in the usual way by means of the gas engine and B is a storage battery which during normal operation of the compressor is connected across the terminals of the generator. The thermostat T may be of any well-known construction and is arranged to operate between the two contacts marked $h$ and $c$, so that as the temperature rises the thermostat moves toward and finally engages contact $h$, whereas when the temperature cools it approaches contact $c$. When contact is made at $h$ the coil C is energized to operate the valve to deliver cool air, whereas when contact is made at $c$ the coil H is energized to operate the valve to deliver hot air. Valve 13 is operated by means of a rod 31 having a plunger on each end, one of which is controlled by the coil marked S, which is energized instantaneously during the starting of the engine and the other controlled by the coil marked R energized for an instant to establish the running condition of the engine. The rod 31 has an extension at each end to open the switches 32 and 33. When the coil S is energized, switch 32, controlling the coil, will be opened, when the valve reaches the limit of its travels, whereas when the coil R is energized, control switch 33 will similarly open to deënergize the coil. The valve 16 is operated in the same manner, that is, by two coils marked C' and H' respectively. These coils are controlled in a similar manner when the valve reaches the limit of its movement in either direction. The speed governor 27 normally operates contacts 34 and 35, which normally bridge contacts 36 and 37 respectively, but when the engine gets up speed are moved downward so as to bridge contacts 38 and 39 respectively. Valve 24 is provided with a bridging contact 40 arranged to bridge the contacts 41 when the pressure falls below a predetermined point. When the contacts 41 are bridged a circuit is closed through the coil C in the same manner as though the thermostat had moved at contact $h$. In other words, the operation of the pressure valve 24 parallels the cooling side of the thermostat. Should pressure in tank 23 fall low enough to operate valve 24 when device is running on heating side, the heating process will be interrupted long enough to charge the tank 23.

With this arrangement of parts the circuit connections and mode of operation are as follows: When the thermostat moves on to the contact $h$ a circuit is closed from the positive side of the battery through the thermostat, coil C and conductor 42, to the other side of the battery or to ground. Coil C is thus energized and three sets of contacts 43, 44 and 45 are bridged. By the bridging of contacts 43 a circuit is closed from the positive side of the battery, across contacts 36, contacts 43, conductor 46, switch 32, coil S and back to the battery. This energizes coil S and moves the valve 13 to starting position. When the starting position is reached, coil S is opened through switch 32. At the same time, by bridging contacts 44 a circuit is closed from the positive side of the battery through conductor 47, coil C', conductor 48, conductor 49, contacts 44 and then through conductor 42 to the negative side. This operates valve 16 and brings it in the position marked "Cold" in Fig. 1, so that cool air will be circulated through the piping system. At the same time that these two valves are operated, the circuit of the spark plug of the engine is energized through bridging contacts 45. The engine now starts, or rather, is driven, by compressed air. When the engine takes up the load and speeds up, the contacts 34 and 35 will be operated and contacts 38 and 39 will be bridged. Upon bridging contacts 38 the battery is connected across the terminals of the generator and by bridging the contacts 39 a circuit is established from the positive side of the battery through conductor 50, contacts 39, conductor 51, coil R and back to the negative side. Coil R now being energized, the valve 13 is removed to the running position, that is, it assumes the position shown in full lines marked "Running" in Fig. 1. The apparatus is now in running position and cool air is being circulated through the pipes. Contacts 37 provide that valve 16 will always return to "Cold" position, otherwise the device would not start. Similarly, when the thermostat moves on to the contact $c$ the coil H is energized from the positive side of the battery, across contacts 52, thence through conductor 42 to the negative side. The contacts 52 are controlled by the coil C and are of course bridged since the coil C is always deënergized when coil H is energized. By energizing coil H, three sets of contacts 53, 54 and 55 are bridged. The contacts 53 control the coil S for starting in exactly the same way as the contacts 43, since the two sets of contacts are parallel. When contacts 54 are bridged no circuit is closed until the contacts 39 are bridged by the starting of the engine. When these contacts are bridged and the engine is running in the usual way the circuit will be closed from the positive side, through conductor 50, contacts 39, conductor 56, coil H', conductor 57 to contacts 54, through conductor 42 back to the negative side of the battery. This operates the valve 16, as before, to shut off the reservoir and admit warm air under pressure through the coils 31 to valve 21 and then to atmosphere. By the bridging of contacts 55 the ignition circuit is closed. When the thermostat moves away from its contact the ignition circuit of the engine is opened and all parts are brought to a standstill.

In Fig. 3 we have shown a slightly modified arrangement in which, instead of a gas engine, a motor M is employed to drive the compressor. In this case, of course, no assistance is needed in the starting, so that there is no valve corresponding to the valve 13 in Figs. 1 and 2. In this case, when the thermostat moves upon the contact $c$ the coil H is energized, bridging contacts 58 and 59. By the bridging of contact 58 a circuit is closed from the positive side across the contacts 58 to the motor starter MS. This is a standard type of motor starter and requires no further description. It is sufficient to state that when contacts 58 are bridged, current passes through the conductor 60 to energize the solenoids 61 and 62 of the starter, to close the motor circuit and gradually cut resistance out of the circuit. This starts the motor M which drives the compressor. By bridging contacts 59, a circuit is closed from the positive main across contacts 59, through coil H' and thence back to the negative main. This operates the switch as before to cut off the radiator 17. The compressed air, in this case as before, will pass through the heating coils 63 directly from the compressor and out through the compression valve 64. Similarly, when the coil C' is operated, the parts assume the position shown in the figure, in which the compressed air is expanded through the expanding cylinder 65 and passes out to atmosphere through the pipe 66. The arrangement shown in this figure may be used where electric current is available, as for instance on board ships. The principle of operation in both cases is the same, the difference being merely in the method of driving the compressor and starting the same.

It will be seen that we have provided means for automatically maintaining a definite temperature, regardless of the conditions, since we are able to supply either hot or cold air. The entire system being automatic requires no attention whatever for a long period of time.

While we have described our invention as embodied in concrete structure and as operated in a definite manner in accordance with the patent statutes, it should be understood that we do not limit our invention thereto, since various modifications thereof will suggest themselves to those skilled in the art, without departing from the spirit of our invention, the scope of which is set forth in the annexed claims.

What we claim as new and desire to secure by Letters Patent of the United States, is:—

1. The combination with an air compressor, of means for expanding the compressed air to cool the same, circulating coils for the air, a thermostatic switch, and means controlled by said switch for automatically connecting the circulating coils either to the cooled air or connecting them directly to compressor and simultaneously closing the coils to maintain the air under pressure.

2. The combination with an air compressor and means for expanding the air compressed thereby to cool the same, of an air circulating piping system arranged to be either open or closed, a thermostatic switch, and means controlled by said switch for either connecting the cool air with the circulating system or closing the system and connecting it directly with the compressor.

3. The combination with an air compressor and a reservoir for the compressed air, of an air expander connected with the reservoir, air circulating coils arranged to be either open or closed, a thermostatic switch, and means controlled by said switch for either connecting the open coils with the expander or closing the coils and connecting them direct to the compressor.

4. The combination with an air compressor and means for expanding the air compressed thereby to cool the same, of an air circulating piping system arranged to be either open or closed and means for either connecting the cool air with the circulating system or closing the system and connecting it direct to the compressor.

5. The combination with an air compressor and means for expanding the air compressed thereby to cool the same, of an air circulating piping system arranged to be either open or closed and automatic means controlled by the temperature for either connecting the cool air with the circulating system or closing the system and connecting it direct to the compressor.

6. The combination with an air compressor, and means for expanding the air compressed thereby to cool the same, of an air circulating piping system arranged to be either open or closed and means controlled by the temperature for either connecting the cool air with the circulating system or closing the system and connecting it direct to the compressor.

7. The combination with an air compressor and means for expanding the air compressed thereby to cool the same, of an air circulating piping system arranged to be either open or closed, and electromagnetic means for either connecting the cool air to the circulating system or closing the system and connecting it directly with the compressor.

8. The combination with an air compressor and means for expanding the air compressed thereby to cool the same, of an air circulating piping system arranged to be either open or closed, a thermostatic switch, and electromagnetic means controlled thereby for either connecting the cool air with the circulating system or closing the system and connecting it directly to the compressor.

9. The combination with an air compressor and means for driving the same, of an air circulating piping system connected at one end to the compressor and arranged to circulate heated air throughout a space to be heated, and a normally closed pressure operated valve connected to the other end of said system and arranged to open to atmosphere at a predetermined pressure.

10. The combination with an air compressor and means for driving the same, of an air circulating piping system connected with one end of the compressor and a normally closed pressure operated valve connected with the other end of said system arranged to open to atmosphere at a predetermined pressure and automatic means for disconnecting the system from the valve and connecting it direct to atmosphere.

11. The combination with an air compressor and means for driving the same, of an air circulating piping system connected to one end of the compressor, a normally closed pressure operated valve connected to the other end of said system arranged to open to atmosphere at a predetermined pressure, a reservoir, and valve mechanism arranged to connect the reservoir between the compressor and the piping system and simultaneously disconnect the system from the pressure operated valve and connect it directly to atmosphere.

12. The combination with an air compressor and an expander for cooling the air compressed thereby, of an air circulating piping system connected at one end to the compressor, a normally closed pressure operated valve connected to the other end of the system, a reservoir, valve mechanism arranged to connect the reservoir between the compressor and the piping system, and the expander between the reservoir and the system and to simultaneously disconnect the system from the pressure operated valve and connect it direct to atmosphere.

13. The combination with an air compressor and means for driving the same, of an air circulating piping system connected to one end of the compressor, a normally closed pressure operated valve connected to the other end of the system, a thermostat, and means controlled thereby for disconnecting the system from the valve and connecting it direct to atmosphere.

14. The combination with an air compressor and means for driving the same, of an air circulating piping system connected at one end to the compressor, a normally closed pressure operated valve connected to the other end of the system, a thermostat, a reservoir, a valve mechanism controlled by the thermostat for connecting the reservoir between the compressor and piping system and simultaneously disconnecting the system from the pressure operated valve and connecting it direct to the atmosphere.

15. The combination with an air compressor, and an expander for cooling the air compressed thereby, of an air circulating piping system connected at one end to the compressor, a normally closed pressure operated valve connected to the other end of said system and arranged to open at predetermined pressure, a reservoir, a thermostat, a valve mechanism controlled by said thermostat for connecting the reservoir between the compressor and the piping system and the expander between the reservoir and the system and simultaneously disconnecting the system from the pressure operated valve and connecting it direct to atmosphere.

16. The combination with an air compressor and a prime mover for driving the same, of means for expanding the air compressed thereby to cool the same, an air circulating piping system arranged to be either opened or closed, a thermostatic switch and means controlled thereby for starting and stopping the prime mover and likewise either connecting the cool air with the circulating system or closing the system and connecting it direct to the atmosphere.

17. The combination with an air compressor and a prime mover for driving the same, of means for expanding the air compressed thereby to cool the same, an air circulating piping system arranged to be either opened or closed, a thermostatic switch and electromagnetic means controlled thereby for starting and stopping the prime mover, and likewise either connecting the cool air with the circulating system or closing the system and connecting it direct to the atmosphere.

In witness whereof, we have hereunto set our hands this 16th day of March, 1909.

CHARLES D. KNIGHT.
WALTER O. LUM.

Witnesses:
ALEX. F. MACDONALD,
RICHARD G. POVEY.